United States Patent
Lundberg et al.

(10) Patent No.: US 8,434,603 B2
(45) Date of Patent: May 7, 2013

(54) LOW CONTENT CONTROL SYSTEM FOR A DUAL CLUTCH TRANSMISSION

(75) Inventors: Philip C. Lundberg, Keego Harbo, MI (US); Bret M. Olson, Whitelake, MI (US); Robert L. Moses, Ann Arbor, MI (US); Kevin Michael Dougan, Plymouth, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 599 days.

(21) Appl. No.: 12/707,494

(22) Filed: Feb. 17, 2010

(65) Prior Publication Data

US 2011/0198179 A1 Aug. 18, 2011

(51) Int. Cl.
*B60W 10/02* (2006.01)
*B60W 10/10* (2012.01)

(52) U.S. Cl.
USPC .................. 192/3.58; 192/48.601; 74/335

(58) Field of Classification Search .................. None
See application file for complete search history.

(56) References Cited

U.S. PATENT DOCUMENTS

| 5,240,093 | A | * | 8/1993 | Wagner et al. ............... 192/3.58 |
| 2010/0190606 | A1 | | 7/2010 | Moses et al. |
| 2010/0288065 | A1 | | 11/2010 | Mohlin et al. |
| 2011/0209470 | A1 | | 9/2011 | Dougan et al. |

FOREIGN PATENT DOCUMENTS

| DE | 19813982 A1 | 10/1999 |
| DE | 19921301 A1 | 11/1999 |
| DE | 19849488 A1 | 5/2000 |
| DE | 10134115 A1 | 1/2003 |
| DE | 10243282 A1 | 4/2004 |
| DE | 102005029963 A1 | 2/2007 |
| EP | 0475488 A1 | 3/1992 |
| EP | 1826438 A2 | 8/2007 |

* cited by examiner

*Primary Examiner* — Richard M. Lorence (57) ABSTRACT

A hydraulic control system for a dual clutch transmission includes a source of pressurized hydraulic fluid, first and second actuator control devices in downstream fluid communication with the source of pressurized hydraulic fluid, and first and second clutch control devices in downstream fluid communication with the source of pressurized hydraulic fluid. A first valve is in downstream fluid communication with the first and second actuator control devices. A second valve is in downstream fluid communication with the first valve, the first clutch control device and the second clutch control device, and the second valve is moveable between two positions by the first and second clutch control devices. Selective activation of combinations of the control devices allows for a pressurized fluid to engage the dual clutch and an actuator in order to shift the transmission into a desired gear ratio.

29 Claims, 4 Drawing Sheets

LOW CONTENT CONTROL SYSTEM FOR A DUAL CLUTCH TRANSMISSION

TECHNICAL FIELD

The invention relates to a control system for a dual clutch transmission, and more particularly to an electro-hydraulic control system having a plurality of solenoids and valves operable to actuate a plurality of actuators within the dual clutch transmission.

BACKGROUND

A typical multi-speed, dual clutch transmission uses a combination of two friction clutches and several dog clutch/synchronizers to achieve "power-on" or dynamic shifts by alternating between one friction clutch and the other, with the synchronizers being "pre-selected" for the oncoming ratio prior to actually making the dynamic shift. "Power-on" shifting means that torque flow from the engine need not be interrupted prior to making the shift. This concept typically uses countershaft gears with a different, dedicated gear pair or set to achieve each forward speed ratio. Typically an electronically controlled hydraulic control circuit or system is employed to control solenoids and valve assemblies. The solenoid and valve assemblies actuate clutches and synchronizers to achieve the forward and reverse gear ratios.

While previous hydraulic control systems are useful for their intended purpose, the need for new and improved hydraulic control system configurations within transmissions which exhibit improved performance, especially from the standpoints of efficiency, responsiveness and smoothness, is essentially constant. Accordingly, there is a need for an improved, cost-effective hydraulic control system for use in a dual clutch transmission.

SUMMARY

A hydraulic control system for a dual clutch transmission is provided. In one example of the hydraulic control system, the hydraulic control system includes a source of pressurized hydraulic fluid, a first actuator control device in downstream fluid communication with the source of pressurized hydraulic fluid, a second actuator control device in downstream fluid communication with the source of pressurized hydraulic fluid, a first clutch control device in downstream fluid communication with the source of pressurized hydraulic fluid, and a second clutch control device in downstream fluid communication with the source of pressurized hydraulic fluid. A first clutch actuator is provided for engaging the dual clutch, wherein the first clutch actuator is in downstream fluid communication with the first clutch control device. A second clutch actuator is provided for engaging the dual clutch, wherein the second clutch actuator is in downstream fluid communication with the second clutch control device. A first valve is in downstream fluid communication with the first and second actuator control devices. A second valve is in downstream fluid communication with the first valve, the first clutch control device and the second clutch control device, and the second valve is moveable between two positions by the first and second clutch control devices. A plurality of actuators are included wherein at least a first of the plurality of actuators is in downstream fluid communication with the first valve and at least a second and a third of the plurality of actuators is in downstream fluid communication with the second valve. The plurality of actuators is operable to selectively actuate the plurality of synchronizers upon receipt of a flow of pressurized hydraulic fluid from at least one of the first and second actuator control devices.

In another example of the present invention, a valve control device is operable to move the first valve between a first and a second position, wherein the first and second actuator control devices are in fluid communication with the first of the plurality of actuators when the first valve is in the second position and wherein the first and second actuator control devices are in fluid communication with the second valve when the first valve is in the first position.

In another example of the present invention, hydraulic fluid from the first clutch control device moves the second valve to a first position and the hydraulic fluid from the second clutch control device moves the second valve to a second position, and wherein the first and second actuator control devices are in fluid communication with the second of the plurality of actuators when the second valve is in the first position and the first and second actuator control devices are in fluid communication with the third of the plurality of actuators when the second valve is in the second position.

In another example of the present invention, the first and second clutch control devices are operable to control a flow of hydraulic fluid through the first and second clutch control devices.

In another example of the present invention, the first and second actuator control devices are operable to control a pressure of hydraulic fluid through the first and second actuator control devices.

In another example of the present invention, the first valve includes a first input in fluid communication with the first actuator control device, a second input in fluid communication with the second actuator control device, a first output, a second output, a third output, and a fourth output. The second valve includes a first input in fluid communication with the second output of the first valve, a second input in fluid communication with the fourth output of the first valve, a first output, a second output, a third output, and a fourth output. The first of the plurality of actuators is in fluid communication with the first and third outputs of the first valve, the second of the plurality of actuators is in fluid communication with the second and fourth outputs of the second valve, and the third of the plurality of actuators is in fluid communication with the first and third outputs of the second valve.

In another example of the present invention, the first valve is operable to communicate hydraulic fluid from the first input to the second output and to communicate hydraulic fluid from the second input to the fourth output when the first valve is in a first position and wherein the first valve is operable to communicate hydraulic fluid from the first input to the first output and to communicate hydraulic fluid from the second input to the third output when the first valve is in a second position.

In another example of the present invention, the second valve is operable to communicate hydraulic fluid from the first input to the second output and to communicate hydraulic fluid from the second input to the fourth output when the second valve is in a first position and wherein the second valve is operable to communicate hydraulic fluid from the first input to the first output and to communicate hydraulic fluid from the second input to the third output when the second valve is in a second position.

In another example of the present invention, the first of the plurality of actuators includes a first port in fluid communication with the first output of the first valve and a second port in fluid communication with the third output of the first valve, wherein the second of the plurality of actuators includes a first port in fluid communication with the second output of the second valve and a second port in fluid communication with the fourth output of the second valve, and wherein the third of the plurality of actuators includes a first port in fluid communication with the first output of the second valve and a second port in fluid communication with the third output of the second valve.

In another example of the present invention, the first and second valves each include a biasing member operable to bias the first and second valves to the first positions.

Further objects, aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1:
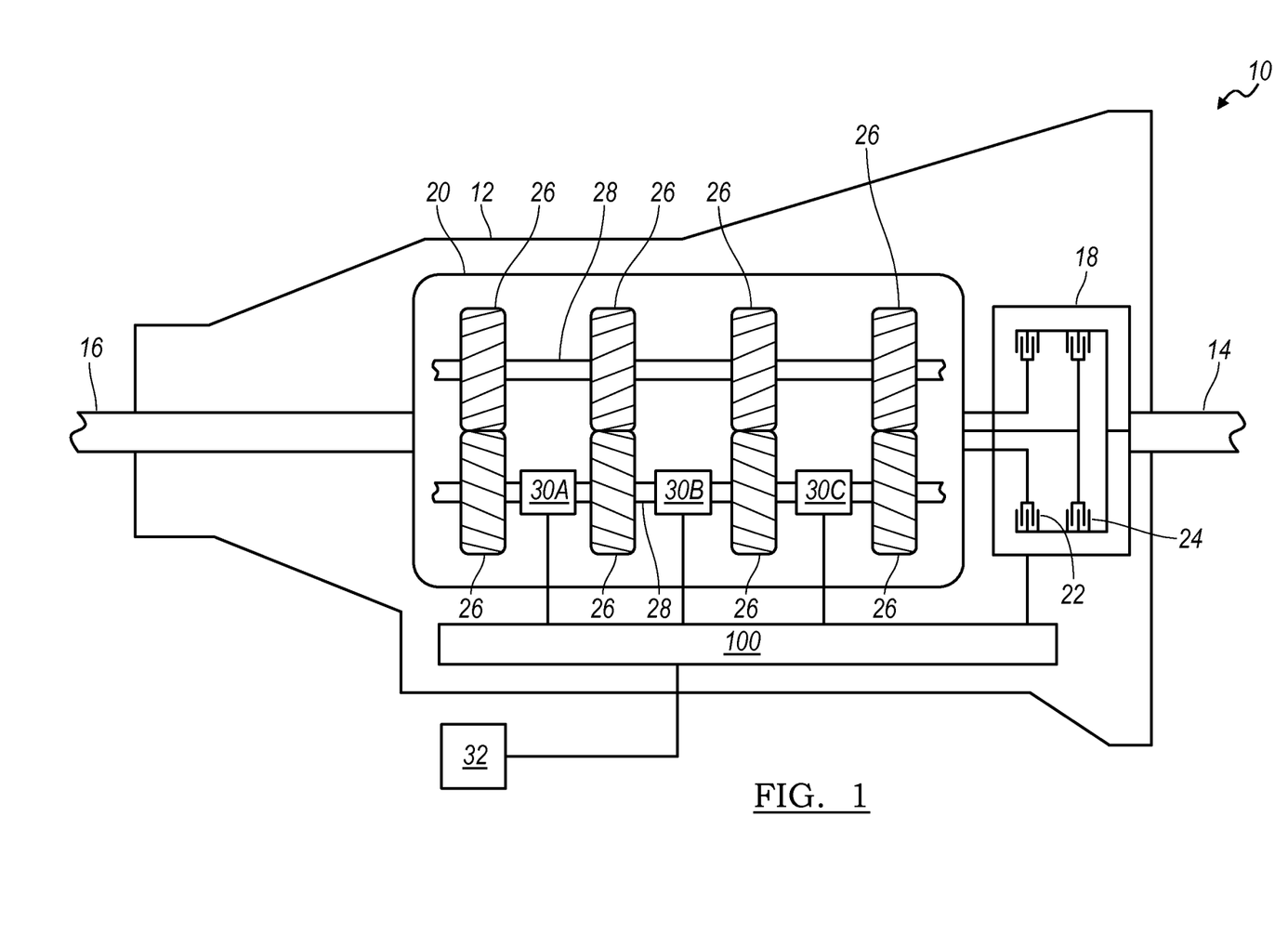
FIG. 1 is a schematic diagram of an exemplary dual clutch automatic transmission incorporating a hydraulic control system according to the principles of the present invention.

With reference to FIG. 1, an exemplary dual clutch automatic transmission incorporating the present invention is illustrated and generally designated by the reference number 10. The dual clutch transmission 10 includes a typically cast, metal housing 12 which encloses and protects the various components of the transmission 10. The housing 12 includes a variety of apertures, passageways, shoulders and flanges which position and support these components. The transmission 10 includes an input shaft 14, an output shaft 16, a dual clutch assembly 18, and a gear arrangement 20. The input shaft 14 is connected with a prime mover (not shown) such as an internal combustion gas or Diesel engine or a hybrid power plant. The input shaft 14 receives input torque or power from the prime mover. The output shaft 16 is preferably connected with a final drive unit (not shown) which may include, for example, propshafts, differential assemblies, and drive axles. The input shaft 14 is coupled to and drives the dual clutch assembly 18. The dual clutch assembly 18 preferably includes a pair of selectively engageable torque transmitting devices including a first torque transmitting device 22 and a second torque transmitting device 24. The torque transmitting devices 22, 24 are preferably dry clutches. The torque transmitting devices 22, 24 are mutually exclusively engaged to provide drive torque to the gear arrangement 20.

The gear arrangement 20 includes a plurality of gear sets, indicated generally by reference number 26, and a plurality of shafts, indicated generally by reference number 28. The plurality of gear sets 26 includes individual intermeshing gears that are connected to or selectively connectable to the plurality of shafts 28. The plurality of shafts 28 may include layshafts, countershafts, sleeve and center shafts, reverse or idle shafts, or combinations thereof. It should be appreciated that the specific arrangement and number of the gear sets 26 and the specific arrangement and number of the shafts 28 within the transmission 10 may vary without departing from the scope of the present invention.

The gear arrangement 20 further includes a first synchronizer assembly 30A, a second synchronizer assembly 30B, and a third synchronizer assembly 30C. The synchronizer assemblies 30A-C are operable to selectively couple individual gears within the plurality of gear sets 26 to the plurality of shafts 28. Each synchronizer assembly 30A-C is disposed either adjacent certain single gears or between adjacent pairs of gears within adjacent gear sets 26. Each synchronizer assembly 30A-C, when activated, synchronizes the speed of a gear to that of a shaft and a positive clutch, such as a dog or face clutch. The clutch positively connects or couples the gear to the shaft. The clutch is bi-directionally translated by a shift rail and fork assembly (not shown) within each synchronizer assembly 30A-C.

The transmission also includes a transmission control module 32. The transmission control module 32 is preferably an electronic control device having a preprogrammed digital computer or processor, control logic, memory used to store data, and at least one I/O peripheral. The control logic includes a plurality of logic routines for monitoring, manipulating, and generating data. The transmission control module 32 controls the actuation of the dual clutch assembly 18 and the synchronizer assemblies 30A-C via a hydraulic control system 100 according to the principles of the present invention.

Figure 2A:
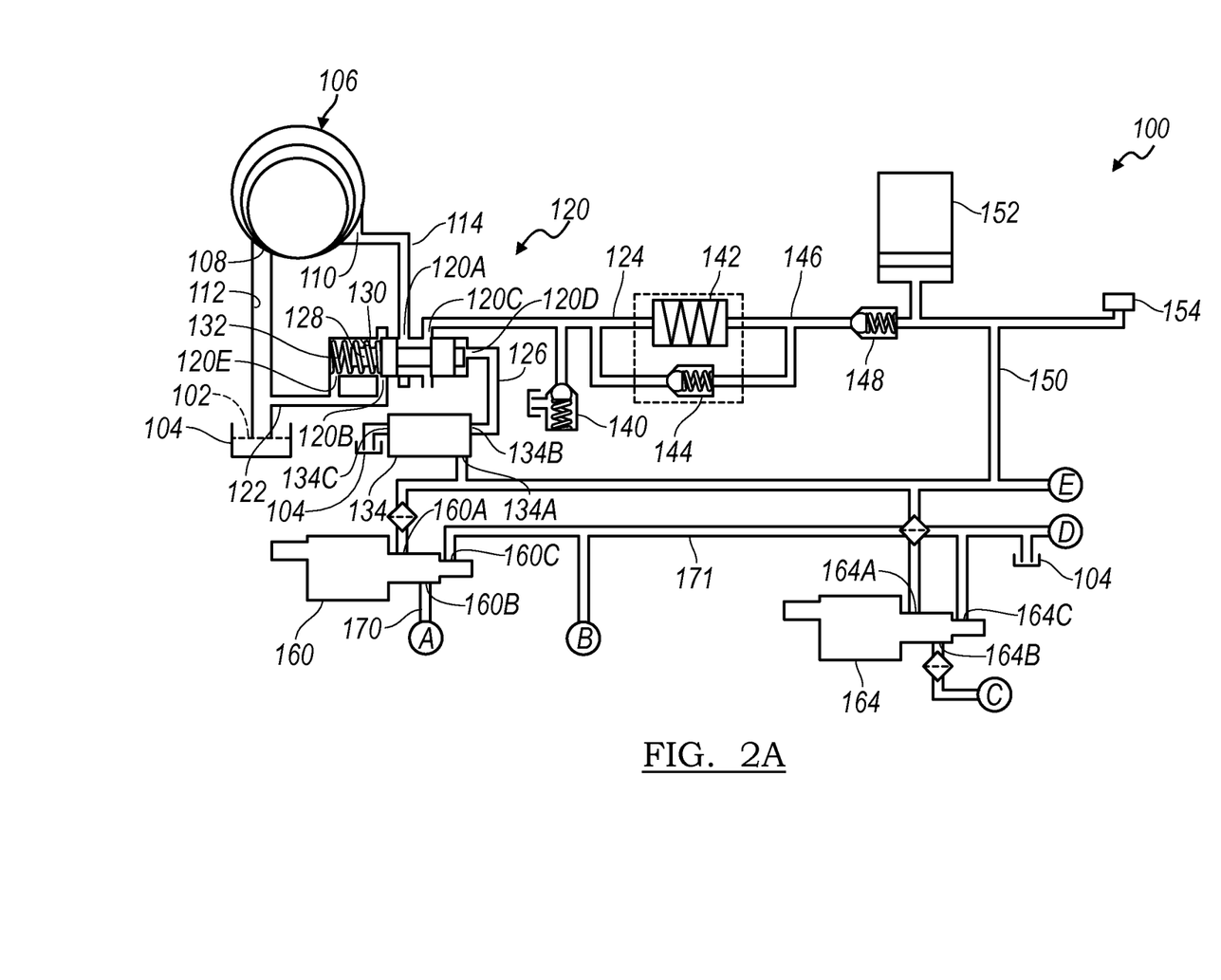
FIGS. 2A, 2B, and 2C are a schematic diagram of an embodiment of a hydraulic control system for a dual clutch transmission according to the principles of the present invention.
Figure 2B:
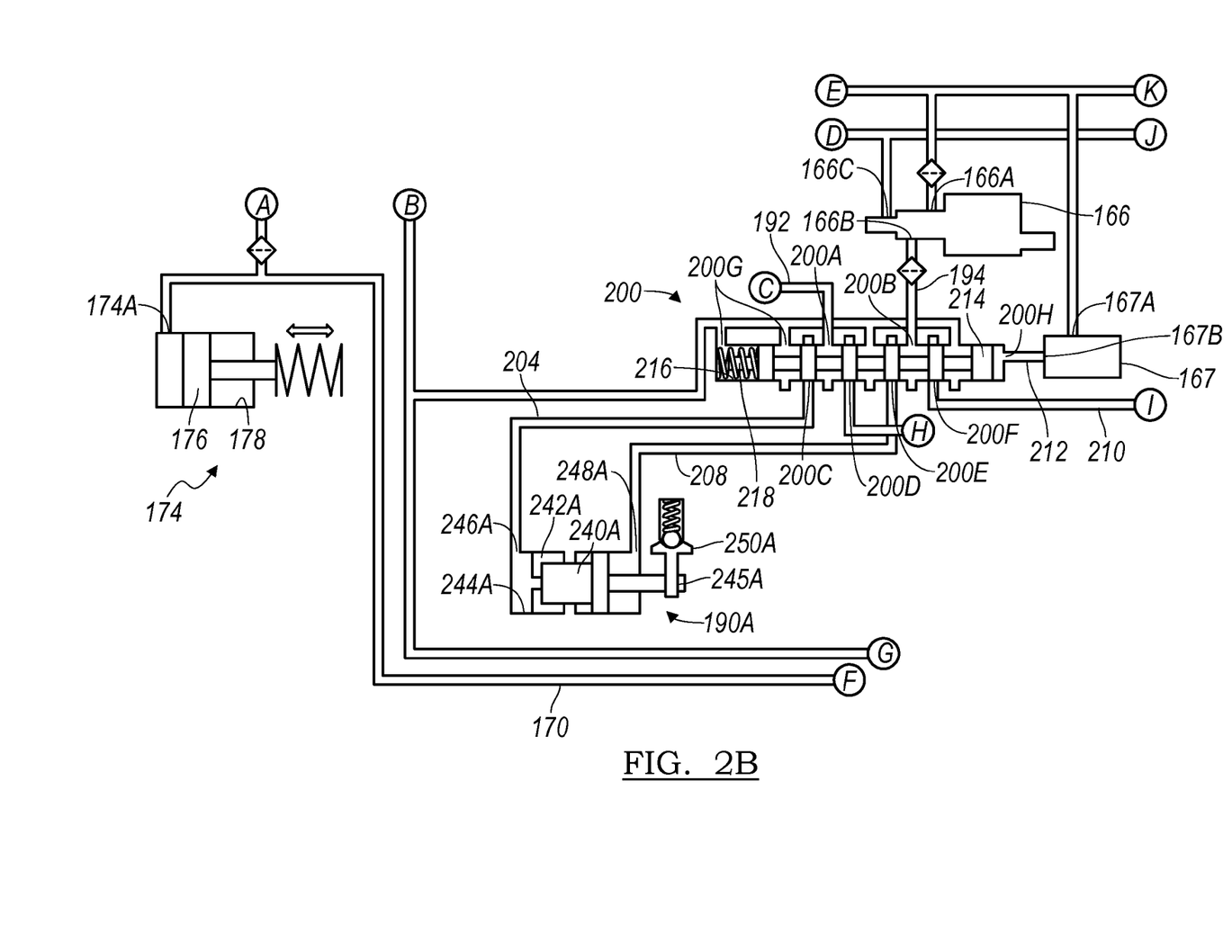
Figure 2C:
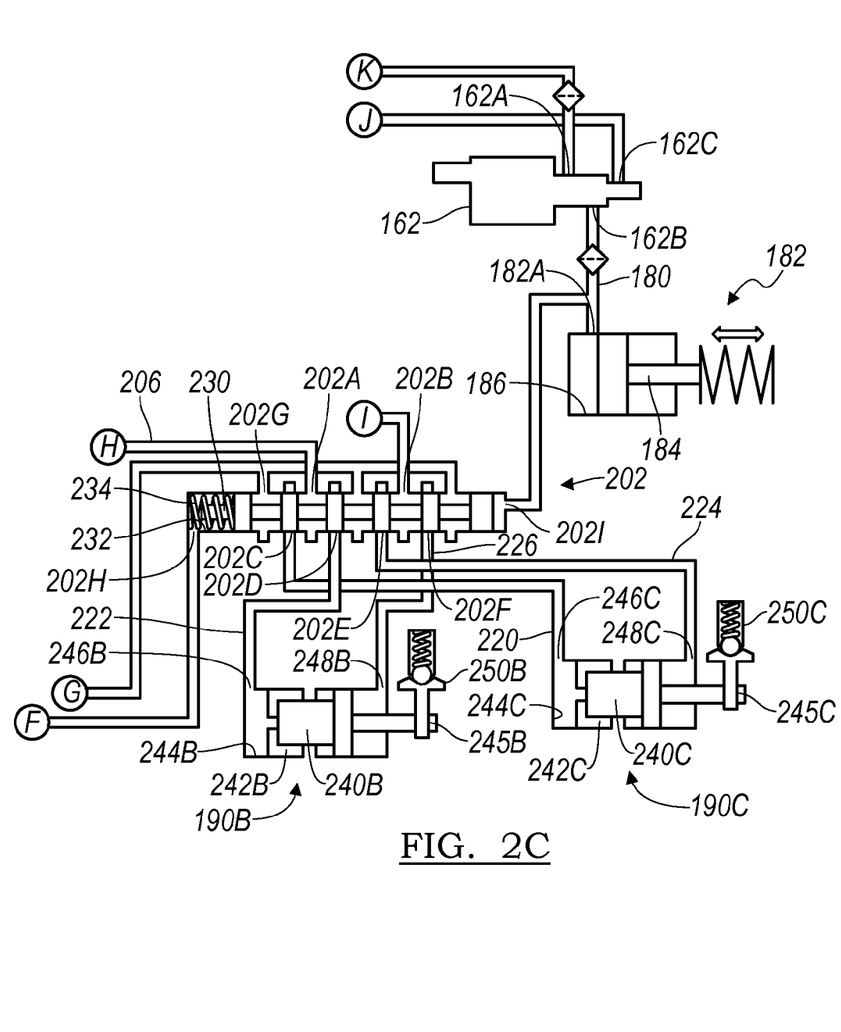

Turning to FIGS. 2A, 2B, and 2C, the hydraulic control system 100 of the present invention is operable to selectively engage the dual clutch assembly 18 and the synchronizer assemblies 30A-C by selectively communicating a hydraulic fluid 102 from a sump 104 to a plurality of shift actuating devices, as will be described in greater detail below. The sump 104 is a tank or reservoir preferably disposed at the bottom of the transmission housing 12 to which the hydraulic fluid 102 returns and collects from various components and regions of the automatic transmission 10. The hydraulic fluid 104 is forced from the sump 104 and communicated throughout the hydraulic control system 100 via a pump 106. The pump 106 is preferably driven by the engine (not shown) and may be, for example, a gear pump, a vane pump, a gerotor pump, or any other positive displacement pump. The pump 106 includes an inlet port 108 and an outlet port 110. The inlet port 108 communicates with the sump 104 via a suction line 112. The outlet port 110 communicates pressurized hydraulic fluid 102 to a supply line 114. The supply line 114 is in communication with a pump bypass valve assembly 120.

The bypass valve assembly 120 is operable to divert the flow of hydraulic fluid 102 from the outlet port 110 of the pump 106 to the inlet port 108 of the pump 106. The bypass valve assembly 120 includes an inlet port 120A, a first outlet port 120B, a second outlet port 120C, a control port 120D, and a exhaust port 120E. The inlet port 120A is in fluid communication with the supply line 114. The first outlet port 120B is in fluid communication with a return line 122. The return line 122 is in fluid communication with the suction line 112. The second outlet port 120C is in fluid communication with an intermediate line 124. The control port 120D is in fluid communication with a control line 126.

The bypass valve assembly 120 further includes a valve 128 slidably disposed within a bore 130. The valve 128 is moveable between at least two positions by a biasing member 132 and a first control device 134. The biasing member 132 is preferably a spring and acts on an end of the valve 128 to bias the valve 128 to the first position or de-stroked position. The first control device 134 is preferably an on-off solenoid that is normally closed. However, it should be appreciated that other types of solenoids and other control devices may be employed without departing from the scope of the present invention. For example, the first control device 134 may be a direct acting solenoid. The first control device 134 includes an inlet port 134A and an outlet port 134B in fluid communication with the control line 126. The first control device 134 is electrically actuated by the controller 32 between a closed state and an open state. In the closed state, the inlet port 134A is prevented from communicating with the outlet port 134B. In the open state, the inlet port 134A is allowed to communicate with the outlet port 134B. Accordingly, the first control device 134, when energized to the open state, allows hydraulic fluid 102 to communicate from the inlet port 134A to the outlet port 134B and from the outlet port 134B to the control port 120D via the control line 126. Then, the hydraulic fluid 102 acts on an end of the valve 128 to move the valve 128 to the second position or stroked position against the bias of the biasing member 132. When the first control device 134 is de-energized or in the closed state, the flow of hydraulic fluid 102 acting against the valve 128 is exhausted through exhaust port 134C and the biasing member 132 moves the valve 128 to the de-stroked position.

When the valve 128 is in the de-stroked position (as shown in FIG. 2), the inlet port 120A is in fluid communication with the second outlet port 120C and the first outlet port 120B is isolated from the inlet port 120A. Accordingly, when the first control device 134 is in the closed state and the valve 128 is in the de-stroked position, pressurized hydraulic fluid 102 from the pump 106 communicates through the bypass valve 120 to the intermediate line 124. When the valve 128 is in the stroked position, the inlet port 120A is in communication with the first outlet port 120B and the second outlet port 120C is isolated from the inlet port 120A. Therefore, when the first control device 134 is in the open state and the valve 128 is in the stroked position, pressurized hydraulic fluid 102 from the pump 106 is communicated through the bypass valve 120 back to the suction line 118.

The intermediate line 124 communicates with a spring biased blow-off safety valve 140, a pressure side filter 142, and a spring biased check valve or cold oil bypass valve 144. The spring biased blow-off safety valve 140 communicates with the sump 104. The spring biased blow-off safety valve 140 is set at a relatively high predetermined pressure and if the pressure of the hydraulic fluid 102 in the intermediate line 124 exceeds this pressure, the safety valve 140 opens momentarily to relieve and reduce the pressure of the hydraulic fluid 102. The pressure side filter 142 is disposed in parallel with the spring biased check valve 144. If the pressure side filter 142 becomes blocked or partially blocked due to, for example, slow moving cold hydraulic fluid 102, pressure within the intermediate line 124 increases and opens the spring biased check valve 144 in order to allow the hydraulic fluid 102 to bypass the pressure side filter 142.

The pressure side filter 142 and the spring biased check valve 144 each communicate with an outlet line 146. The outlet line 146 is in communication with a second check valve 148. The second check valve 148 is in communication with a main supply line 150 and is configured to maintain hydraulic pressure within the main supply line 150. The main supply line 150 supplies pressurized hydraulic fluid to an accumulator 152, a main pressure sensor 154, and a plurality of control devices 160, 162, 164, 166, 167 and with the inlet port 134A of the pump bypass control device 134. The accumulator 152 is an energy storage device in which the non-compressible hydraulic fluid 102 is held under pressure by an external source. In the example provided, the accumulator 152 is a spring type or gas filled type accumulator having a spring or compressible gas that provides a compressive force on the hydraulic fluid 102 within the accumulator 152. However, it should be appreciated that the accumulator 152 may be of other types without departing from the scope of the present invention. Accordingly, the accumulator 152 is operable to supply pressurized hydraulic fluid 102 back to the main supply line 150. However, upon discharge of the accumulator 152, the second check valve 148 prevents the pressurized hydraulic fluid 102 from returning to the pump 106 and the bypass valve 120. The accumulator 152, when charged, effectively replaces the pump 106 as the source of pressurized hydraulic fluid 102, thereby eliminating the need for the pump 106 to run continuously. The main pressure sensor 154 reads the pressure of the hydraulic fluid 102 within the main supply line 150 in real time and provides this data to the transmission control module 32.

The pump 106 is used primarily for charging the accumulator 152. Actuation of torque transmitting devices is achieved via discharge of the accumulator 152. Accordingly, the hydraulic control subsystem 100 operates to keep the accumulator charged 152 using the pump 106 while reducing the amount of losses due to the pump 106 operating continuously due to being driven by the engine.

For example, the main pressure sensor 154 is used to monitor the pressure of the hydraulic fluid 102 within the accumulator 152. If the accumulator 152 is not fully charged or drops below a threshold value, the controller 32 orders the first control device 134 to the closed state. Therefore, the biasing member 132 within the bypass valve 120 moves the valve 128 to the de-stroked position. Hydraulic fluid 102 is pumped under pressure from the pump 106 to the inlet port 120A of the bypass valve 120 via the supply line 114, from the inlet port 120A to the second outlet port 120C, from the second outlet port 120C to the pressure side filter 142 via the intermediate line 124, from the pressure side filter 142 to one way valve 148 via the outlet line 146, and from the one-way valve 148 to the accumulator 152 via the main supply line 150. The hydraulic fluid 102 from the pump 104 has sufficient pressure to charge the accumulator 152.

Once the main pressure sensor 154 senses a pressure of the hydraulic fluid 102 within the main supply line 150 that is indicative that the accumulator 152 is fully charged, the controller 32 commands the first control device 134 to the open state. Accordingly, hydraulic fluid 102 communicates through the first control device 134 to the control port 120D of the bypass valve 120 via the control line 126. The hydraulic fluid 102 acts on the valve 128 and moves the valve 128 to the stroked position. Hydraulic fluid 102 is pumped under pressure from the pump 106 to the inlet port 120A of the bypass valve 120 via the supply line 114, from the inlet port 120A to the first outlet port 120B, and from the first outlet port 120B to the return line 122 and the suction line 112. Accordingly, the output pressure of the hydraulic fluid 102 from the pump 106 drops to near zero. This in turn reduces the pump torque load on the engine, thereby improving the efficiency of the motor vehicle and transmission.

As noted above, the main supply line 150 supplies pressurized hydraulic fluid 102 to the plurality of control devices 160, 162, 164, 166, and 167. The control devices 160 and 162 are first and second clutch flow control devices, respectively. The control devices 164 and 166 are first and second pressure control devices, respectively. The control device 167 is a valve actuation device. The first clutch flow control device 160 is preferably an electrically controlled variable force solenoid that is operable to control a flow of the hydraulic fluid 102 from the accumulator 152 to actuate the first torque transmitting device 22, as will be described in greater detail below. The first clutch flow control device 160 includes an inlet port 160A that communicates with an outlet port 160B when the first clutch flow control device 160 is activated or energized and includes an exhaust port 160C that communicates with the outlet port 160B when the first clutch flow control device 160 is inactive or de-energized. Variable activation of the first clutch flow control device 160 regulates or controls the flow of the hydraulic fluid 102 as the hydraulic fluid 102 communicates from the inlet port 160A to the outlet port 160B and from the outlet port 160B to the exhaust port 160C. The inlet port 160A is in communication with the main supply line 150. The outlet port 160B is in communication with a first clutch supply line 170. The exhaust port 160C is in communication with an exhaust line 171 that communicates with the sump 104.

The first clutch supply line 170 is in fluid communication with an inlet/outlet port 174A in a first clutch piston assembly 174. The first clutch piston assembly 174 includes a single acting piston 176 slidably disposed in a cylinder 178. The piston 176 translates under hydraulic pressure to engage the first torque transmitting device 22, shown in FIG. 1. When the first clutch flow control device 160 is activated or energized, a flow of pressurized hydraulic fluid 102 is provided to the first clutch supply line 170. The flow of pressurized hydraulic fluid 102 is communicated from the first clutch supply line 170 to the first clutch piston assembly 174 where the pressurized hydraulic fluid 102 translates the piston 176, thereby engaging the first torque transmitting device 22. When the first clutch flow control solenoid 160 is de-energized, the inlet port 160A is closed and hydraulic fluid from the cylinder 178 passes from the outlet port 160B to the exhaust port 160C and into the sump 104, thereby disengaging the first torque transmitting device 22.

The second clutch flow control device 162 is preferably an electrically controlled variable force solenoid that is operable to control a flow of the hydraulic fluid 102 from the accumulator 152 to actuate the second torque transmitting device 24, as will be described in greater detail below. The second clutch flow control device 162 includes an inlet port 162A that communicates with an outlet port 162B when the second clutch flow control device 162 is activated or energized and includes an exhaust port 162C that communicates with the outlet port 162B when the second clutch flow control device 162 is inactive or de-energized. Variable activation of the second clutch flow control device 162 regulates or controls the flow of the hydraulic fluid 102 as the hydraulic fluid 102 communicates from the inlet port 162A to the outlet port 162B and from the outlet port 162B to exhaust port 162C. The inlet port 162A is in communication with the main supply line 150. The outlet port 162B is in communication with a second clutch supply line 180. The exhaust port 162C is in communication with the sump 104 via the exhaust line 171.

The second clutch supply line 180 is in fluid communication with an inlet/outlet port 182A in a second clutch piston assembly 182. The second clutch piston assembly 182 includes a single acting piston 184 slidably disposed in a cylinder 186. The piston 184 translates under hydraulic pressure to engage the second torque transmitting device 24, shown in FIG. 1. When the second clutch flow control device 162 is activated or energized, a flow of pressurized hydraulic fluid 102 is provided to the second clutch supply line 180. The flow of pressurized hydraulic fluid 102 is communicated from the second clutch supply line 180 to the second clutch piston assembly 182 where the pressurized hydraulic fluid 102 translates the piston 184, thereby engaging the second torque transmitting device 24. When the second clutch flow control solenoid 162 is de-energized, the inlet port 162A is closed and hydraulic fluid from the cylinder 186 passes from the outlet port 162B to the exhaust port 162C and into the sump 104 via the exhaust line 171, thereby disengaging the second torque transmitting device 24.

The first pressure control device 164 is operable to control the pressure of hydraulic fluid 102 delivered to one side of each of a plurality of synchronizer pistons 190A-C, as will be described in greater detail below. The first pressure control device 164 is preferably an electrically controlled variable force solenoid having an internal closed loop pressure control. Various makes, types, and models of solenoids may be employed with the present invention so long as the first pressure control device 164 is operable to control the pressure of the hydraulic fluid 102. The first pressure control device 164 includes an inlet port 164A that communicates with an outlet port 164B when the first pressure control device 164 is activated or energized and includes an exhaust port 164C that communicates with the outlet port 164B when the first pressure control device 164 is inactive or de-energized. Variable activation of the first pressure control device 164 regulates or controls the pressure of the hydraulic fluid 102 as the hydraulic fluid 102 communicates from the inlet port 164A to the outlet port 164B. The internal closed loop pressure control provides pressure feedback within the solenoid to adjust the amount of pressure to the outlet port 164B based on a particular current command from the controller 32, thereby controlling pressure. The inlet port 164A is in communication with the main supply line 150. The outlet port 164B is in communication with a first valve feed line 192. The exhaust port 164C is in communication with the sump 104 via the exhaust line 171.

The second pressure control device 166 is operable to control the pressure of hydraulic fluid 102 delivered to one side of each of the plurality of synchronizer seconds 190A-C, as will be described in greater detail below. The second pressure control device 166 is preferably an electrically controlled variable force solenoid having an internal closed loop pressure control. Various makes, types, and models of solenoids may be employed with the present invention so long as the second pressure control device 166 is operable to control the pressure of the hydraulic fluid 102. The second pressure control device 166 includes an inlet port 166A that communicates with an outlet port 166B when the second pressure control device 166 is activated or energized and includes an exhaust port 166C that communicates with the outlet port 166B when the second pressure control device 166 is inactive or de-energized. Variable activation of the second pressure control device 166 regulates or controls the pressure of the hydraulic fluid 102 as the hydraulic fluid 102 communicates from the inlet port 166A to the outlet port 166B. The internal closed loop pressure control provides pressure feedback within the solenoid to adjust the amount of pressure to the outlet port 166B based on a particular current command from the controller 32, thereby controlling pressure. The inlet port 166A is in communication with the main supply line 150. The outlet port 166B is in communication with a second valve feed line 194. The exhaust port 166C is in communication with the sump 104 via the exhaust line 171.

The first and second pressure control devices communicate pressurized hydraulic fluid via the valve feed lines 192 and 194 to a first valve assembly 200. The first valve assembly 200 is operable to selectively direct the pressurized hydraulic fluid 102 flows from the first and second pressure control devices 164 and 166 to the first synchronizer actuator 190A and to a second valve assembly 202, as will be described in greater detail below. The first valve assembly 200 includes a first inlet port 200A, a second inlet port 200B, a first outlet port 200C, a second outlet port 200D, a third outlet port 200E, a fourth outlet port 200F, a plurality of exhaust ports 200G, and a control port 200H. The first inlet port 200A is in communication with the first valve feed line 192. The second inlet port 200B is in communication with the second valve feed line 194. The first outlet port 200C is in communication with a synchronizer supply line 204. The second outlet port 200D is in communication with an intermediate line 206. The third outlet port 200E is in communication with a synchronizer supply line 208. The fourth outlet port 200F is in communication with an intermediate line 210. The exhaust ports 200G are in communication with the exhaust line 171. The control port 200H is in communication with a control line 212 that communicates with the control device 167.

The first valve assembly 200 further includes a valve 214 slidably disposed within a bore 216. The valve 214 is moveable between at least two positions by a biasing member 218 and the control device 167. The biasing member 218 is preferably a spring and acts on an end of the valve 214 to bias the valve 214 to the first position or de-stroked position. The control device 167 is preferably an on-off solenoid that is normally closed. However, it should be appreciated that other types of solenoids and other control devices may be employed without departing from the scope of the present invention. For example, the control device 167 may be a direct acting solenoid. The control device 167 includes an inlet port 167A in fluid communication with the main supply line 150 and an outlet port 167B in fluid communication with the control line 212. The control device 167 is electrically actuated by the controller 32 between a closed state and an open state. In the closed state, the inlet port 167A is prevented from communicating with the outlet port 167B. In the open state, the inlet port 167A is allowed to communicate with the outlet port 167B. Accordingly, the first control device 167, when energized to the open state, allows hydraulic fluid 102 to communicate from the inlet port 167A to the outlet port 167B and from the outlet port 167B to the control port 200H via the control line 212. Then, the hydraulic fluid 102 acts on an end of the valve 214 to move the valve 214 to the second position or stroked position against the bias of the biasing member 218. When the control device 167 is de-energized or in the closed state, the flow of hydraulic fluid 102 acting against the valve 214 is cut off and the biasing member 218 moves the valve 214 to the de-stroked position.

When the valve 214 is in the de-stroked position, the first inlet port 200A is in communication with the second outlet port 200D, the second inlet port 200B is in communication with the fourth outlet port 200F, and the first and third outlet ports 200C, 200E are in communication with the exhaust ports 200G. When the valve 214 is in the stroked position, the first inlet port 200A is in communication with the first outlet port 200C, the second inlet port 200B is in communication with the third outlet port 200E, and the second and fourth outlet ports 200D, 200F are in communication with the exhaust ports 200G. Accordingly, when the control device 167 is opened, pressurized hydraulic fluid 102 flows from the first and second pressure control devices 164 and 166 are communicated to the first synchronizer actuator 190A. When the control device 167 is closed, pressurized hydraulic fluid 102 flows from the first and second pressure control devices 164 and 166 are communicated to the second valve assembly 202.

The second valve assembly 202 is operable to direct the flows of pressurized hydraulic fluid 102 from the first and second pressure control devices 164 and 166 received via fluid lines 206 and 210, respectively, to the second synchronizer actuator 190B and to the third synchronizer actuator 190C, as will be described in greater detail below. The second valve assembly 202 includes a first inlet port 202A, a second inlet port 202B, a first outlet port 202C, a second outlet port 202D, a third outlet port 202E, a fourth outlet port 202F, a plurality of exhaust ports 202G, a first control port 202H, and a second control port 202I. The first inlet port 202A is in communication with intermediate line 206. The second inlet port 202B is in communication with intermediate line 210. The first outlet port 202C is in communication with a synchronizer supply line 220. The second outlet port 202D is in communication with a synchronizer supply line 222. The third outlet port 202E is in communication with a synchronizer supply line 224. The fourth outlet port 202F is in communication with a synchronizer supply line 226. The exhaust ports 202G are in communication with the exhaust line 171. The first control port 202H is in communication with the first clutch supply line 170. The second control port 202I is in communication with the second clutch supply line 180.

The second valve assembly 202 further includes a valve 230 slidably disposed within a bore 232. The valve 230 is moveable between two positions by a biasing member 234 and by fluid flow communicated from the first and second clutch flow control devices 160 and 162 via clutch supply lines 170 and 180, respectively. The biasing member 234 is preferably a spring and acts on an end of the valve 230 to bias the valve 230 to the first position or de-stroked position. When the first clutch flow control device 160 is opened in order to engage the first clutch 22, a flow of the hydraulic fluid 102 is communicated to the piston assembly 174, as described above, and also to the control port 202H via control line 170. Simultaneously, the second clutch flow control device 162 is closed. The hydraulic fluid 102 acts on an end of the valve 230 along with the biasing member 234 to move the valve 230 to the de-stroked position. When the second clutch flow control device 162 is opened in order to engage the second clutch 24, the first clutch flow control device 160 is closed and a flow of the hydraulic fluid 102 is communicated to the piston assembly 182, as described above, and also to the control port 202I via control line 180. Then, the hydraulic fluid 102 acts on an end of the valve 230 and moves the valve 230 to the stroked position against the bias of the biasing member 218.

When the valve 230 is in the de-stroked position, the first inlet port 202A is in communication with the second outlet port 202D, the second inlet port 202B is in communication with the fourth outlet port 202F, and the first and third outlet ports 202C, 202E are in communication with the exhaust ports 200G. When the valve 230 is in the stroked position, the first inlet port 202A is in communication with the first outlet port 202C, the second inlet port 202B is in communication with the third outlet port 202E, and the second and fourth outlet ports 202D, 202F are in communication with the exhaust ports 202G. Accordingly, when the first clutch 22 is engaged, flows of pressurized hydraulic fluid 102 from the first and second pressure control devices 164 and 166 are communicated to the second synchronizer actuator 190B. When the second clutch 24 is engaged, flows of pressurized hydraulic fluid 102 from the first and second pressure control devices 164 and 166 are communicated to the third synchronizer actuator 190C. It should be appreciated that the gears 26 engaged by the synchronizer assembly 30B which is in turn actuated by the synchronizer actuator 190B are not associated with the engagement of the first clutch 22 (i.e. engagement of the first clutch 22 does not transfer torque to whichever of the gears 26 are engaged by the synchronizer assembly 30B). Similarly, the gears 26 engaged by the synchronizer assembly 30C which is in turn actuated by the synchronizer actuator 190C are not associated with the engagement of the second clutch 24 (i.e. engagement of the second clutch 24 does not transfer torque to whichever of the gears 26 are engaged by the synchronizer assembly 30C).

The synchronizer actuators 190A-C are preferably three-area piston assemblies operable to each engage or actuate a shift rail in a synchronizer assembly, but can be two-area piston assemblies without departing from the scope of the present invention. More specifically, the first synchronizer actuator 190A is operable to actuate the first synchronizer assembly 30A, the second synchronizer actuator 190B is operable to actuate the second synchronizer assembly 30B, and the third synchronizer actuator 190C is operable to actuate the third synchronizer assembly 30C. The first synchronizer actuator 190A includes a first piston 240A and a second piston 242A. The pistons 240A, 242A are slidably disposed within a piston housing or cylinder 244A. The pistons 240A, 242A present three separate areas for pressurized hydraulic fluid to act upon. The first piston 240A engages or contacts a finger lever or other shift rail component 245A of the first synchronizer assembly 30A. The first synchronizer actuator 190A includes a fluid port 246A that communicates with one end of the first piston 240A and with the second piston 242A and includes a fluid port 248A that communicates with an opposite end of the first piston 240A. Fluid port 246A is in communication with synchronizer supply line 204 and fluid port 248A is in communication with synchronizer supply line 208. Accordingly, the pressurized hydraulic fluid 102 communicated from the first valve assembly 200 enters the first synchronizer actuator 190A through the fluid ports 246A, 248A and contacts the pistons 240A, 242A. The difference in pressure between the hydraulic fluid 102 delivered to fluid port 246A from the first pressure control device 164 and the hydraulic fluid 102 delivered to fluid port 248A from the second pressure control device 166 moves the pistons 240A, 242A between various positions. Each position in turn corresponds to a position of the shift rail of the first synchronizer assembly 30A (i.e., engaged left, engaged right, and neutral). The first synchronizer assembly 30A is kept in position by a detent system 250A that prevents the shift rail component 245A from translating during unpressurized conditions within the cylinder 244A.

The second synchronizer actuator 190B includes a first piston 240B and a second piston 242B. The pistons 240B, 242B are slidably disposed within a piston housing or cylinder 244B. The pistons 240B, 242B present three separate areas for pressurized hydraulic fluid to act upon. The first piston 240B engages or contacts a finger lever or other shift rail component 245B of the second synchronizer assembly 30B. The second synchronizer actuator 190B includes a fluid port 246B that communicates with one end of the first piston 240B and with the second piston 242B and includes a fluid port 248B that communicates with an opposite end of the first piston 240B. Fluid port 246B is in communication with synchronizer supply line 222 and fluid port 248B is in communication with synchronizer supply line 226. Accordingly, the pressurized hydraulic fluid 102 communicated from the second valve assembly 202 enters the second synchronizer actuator 190B through the fluid ports 246B, 248B and contacts the pistons 240B, 242B. The difference in pressure between the hydraulic fluid 102 delivered to fluid port 246B from the first pressure control device 164 and the hydraulic fluid 102 delivered to fluid port 248B from the second pressure control device 166 moves the pistons 240B, 242B between various positions. Each position in turn corresponds to a position of the shift rail of the second synchronizer assembly 30B (i.e., engaged left, engaged right, and neutral). The second synchronizer assembly 30B is kept in position by a detent system 250B that prevents the shift rail component 245B from translating during unpressurized pressure conditions within the cylinder 244B.

The third synchronizer actuator 190C includes a first piston 240C and a second piston 242C. The pistons 240C, 242C are slidably disposed within a piston housing or cylinder 244C. The pistons 240C, 242C present three separate areas for pressurized hydraulic fluid to act upon. The first piston 240C engages or contacts a finger lever or other shift rail component 245C of the third synchronizer assembly 30C. The third synchronizer actuator 190C includes a fluid port 246C that communicates with one end of the first piston 240C and with the second piston 242C and includes a fluid port 248C that communicates with an opposite end of the first piston 240C. Fluid port 246C is in communication with synchronizer supply line 220 and fluid port 248C is in communication with synchronizer supply line 224. Accordingly, the pressurized hydraulic fluid 102 communicated from the second valve assembly 202 enters the third synchronizer actuator 190C through the fluid ports 246C, 248C and contacts the pistons 240C, 242C. The difference in pressure between the hydraulic fluid 102 delivered to fluid port 246C from the first pressure control device 164 and the hydraulic fluid 102 delivered to fluid port 248C from the second pressure control device 166 moves the pistons 240C, 242C between various positions. Each position in turn corresponds to a position of the shift rail of the third synchronizer assembly 30C (i.e., engaged left, engaged right, and neutral). The third synchronizer assembly 30C is kept in position by a detent system 250C that prevents the shift rail component 245C from translating during neutral pressure conditions within the cylinder 244C.

During general operation of the hydraulic control system 100, the accumulator 152 provides the pressurized hydraulic fluid 102 throughout the system and the pump 106 is employed to charge the accumulator 152. Selection of a particular forward or reverse gear ratio is achieved by first selectively actuating one of the synchronizer assemblies 30A-C and then selectively actuating one of the torque transmitting devices 22, 24 to transfer torque to whichever of the synchronizer assemblies 30A-C are engaged. It should be appreciated that which actuator assembly 30A-C and which torque transmitting device 22, 24 provide which forward or reverse gear ratio may vary without departing from the scope of the present invention. However, the hydraulic control system 100 pre-selects a first gear ratio when the clutches 22, 24 are initially disengaged and the biasing members 218 and 232 de-stroke the valve assemblies 200 and 202, respectively. To pre-select a reverse gear ratio, the solenoid 167 is opened, thereby moving the first valve assembly 200 to the stroked position.

To engage the reverse gear ratio, one of the pressure control solenoids 164 and 166 are opened to move the first synchronizer actuator 190A to engage the reverse gear ratio. Then, the clutch associated with the gear sets 26 of the reverse gear ratio, the second clutch 24 in the example provided, is engaged by opening the second clutch flow control device 162. Torque transfers through the first synchronizer assembly 30A to engage the reverse gear ratio. The hydraulic control system disengages the reverse gear ratio by disengaging the second clutch 24 through closing the second clutch control device 162. Then the first synchronizer assembly 30A is neutralized by energizing both pressure control devices 164 and 166. Finally, the control device 167 is closed such that the first valve assembly 200 moves back to the de-stroked position and the second clutch 24 is disengaged, thereby returning the hydraulic control system to a first gear pre-select.

To engage the first gear ratio, one of the pressure control solenoids 164 and 166 are opened to move the second synchronizer actuator 190B to engage the first gear ratio. Then, the clutch associated with the gear sets 26 of the first gear ratio, the second clutch 24 in the example provided, is engaged by opening the second clutch flow control device 162. Torque transfers through the second synchronizer assembly 30B to engage the first gear ratio. Simultaneously, the flow of hydraulic fluid 102 from the second clutch flow control device 162 moves the valve 202 to the stroked position, thereby allowing for the pre-selection of the second gear ratio for engagement through the third synchronizer actuator 190C.

To engage the second gear ratio, one of the first and second pressure control devices 164 and 166 are opened to move the third synchronizer actuator 190C to engage the second gear ratio. Then, the clutch associated with the gear sets 26 of the second gear ratio, the first clutch 22 in the example provided, is engaged by opening the first clutch flow control device 160 and the second clutch 24 is disengaged. Torque transfers through the third synchronizer assembly 30C to engage the second gear ratio. Simultaneously, the flow of hydraulic fluid 102 from the first clutch flow control device 160 moves the valve 202 to the stroked position. To pre-select the third gear ratio, all other odd gear synchronizers must be neutralized through using actuator control solenoids 164 and 166, then solenoid 167 is opened and the first valve assembly 200 is stroked into a position to allow for the pre-selection of third gear.

To engage the third gear ratio, one of the first and second pressure control devices 164 and 166 are opened to move the first synchronizer actuator 190A to engage the third gear ratio. Then, the clutch associated with the gear sets 26 of the third gear ratio, the second clutch 24 in the example provided, is engaged by opening the second clutch flow control device 162 and the first clutch 22 is disengaged. Torque transfers through the first synchronizer assembly 30A to engage the third gear ratio. Simultaneously, the flow of hydraulic fluid 102 from the second clutch flow control device 162 moves the valve 202 to the stroked position. This allows for the even gears to be deselected, and for the logic valves 200 and 202 to be in the correct position to pre-select the fourth gear ratio through using actuator control solenoids 164 and 166.

To engage the fourth gear ratio, one of the first and second pressure control devices 164 and 166 are opened to move the third synchronizer actuator 190C to engage the fourth gear ratio. Then, the clutch associated with the gear sets 26 of the fourth gear ratio, the first clutch 22 in the example provided, is engaged by opening the first clutch flow control device 160 and the second clutch 24 is disengaged. Torque transfers through the third synchronizer assembly 30C to engage the fourth gear ratio. Simultaneously, the flow of hydraulic fluid 102 from the first clutch flow control device 160 moves the valve 202 to the de-stroked position thereby allowing for the de-selection of the odd gears using the actuator pressure control solenoid 164 and 166. Once there is no odd gear synchronized, then the fifth gear ratio can be pre-selected.

To engage the fifth gear ratio, one of the first and second pressure control devices 164 and 166 are opened to move the second synchronizer actuator 190B to engage the fifth gear ratio. Then, the clutch associated with the gear sets 26 of the fifth gear ratio, the second clutch 24 in the example provided, is engaged by opening the second clutch flow control device 162 and the first clutch 22 is disengaged. Torque transfers through the second synchronizer assembly 30B to engage the fifth gear ratio. Simultaneously, the flow of hydraulic fluid 102 from the second clutch flow control device 162 moves the valve 202 to the stroked position. This allows for the synchronizer neutralization of all even gears, thereby allowing for the pre-selection the fourth gear ratio in preparation for down-shifting, and the operation continues as described above.

To engage or actuate the first torque transmitting device 22 the first clutch control device 160 is energized. To engage or actuate the second torque transmitting device 24 the second clutch control device 162 is energized.

The components of the hydraulic control subsystem 100 are connected via a plurality of fluid communication lines, as described above. It should be appreciated that the fluid communication lines may be integrated in a valve body or formed from separate tubing or piping without departing from the scope of the present invention. In addition, the fluid communication lines may have any cross sectional shape and may include additional or fewer bends, turns, and branches than illustrated without departing from the scope of the present invention. The valve assemblies described above are illustrated as spool valve assemblies having multiple ports. However, it should be appreciated that other specific types of valves having greater or fewer ports may be provided without departing from the scope of the present invention. Finally, it should be appreciated that the source of pressurized hydraulic fluid, i.e. the pump accumulator 152, pump bypass valve 120, and the engine driven pump 106 may be replaced by alternate hydraulic fluid sources, such as an electrically driven pump.

The hydraulic control system 100 provides a minimum of controls to efficiently and effectively control the transmission 10 having at least five forward gear ratios and at least one reverse gear ratios. By controlling the position of the second valve using the clutch control devices 160 and 162, additional control devices are kept to a minimum.

The description of the invention is merely exemplary in nature and variations that do not depart from the general essence of the invention are intended to be within the scope of the invention. Such variations are not to be regarded as a departure from the spirit and scope of the invention.

We claim the following:

1. A hydraulic control system for controlling a dual clutch and a plurality of synchronizers in a transmission, the hydraulic control system comprising:

a source of pressurized hydraulic fluid;

a first actuator control device in downstream fluid communication with the source of pressurized hydraulic fluid;

a second actuator control device in downstream fluid communication with the source of pressurized hydraulic fluid;

a first clutch control device in downstream fluid communication with the source of pressurized hydraulic fluid;

a first clutch actuator for engaging the dual clutch, wherein the first clutch actuator is in downstream fluid communication with the first clutch control device;

a second clutch control device in downstream fluid communication with the source of pressurized hydraulic fluid;

a second clutch actuator for engaging the dual clutch, wherein the second clutch actuator is in downstream fluid communication with the second clutch control device;

a first valve in downstream fluid communication with the first and second actuator control devices;

a second valve in downstream fluid communication with the first valve, the first clutch control device and the second clutch control device, and wherein the second valve is moveable between at least two positions by the first and second clutch control devices; and a plurality of actuators wherein at least a first of the plurality of actuators is in downstream fluid communication with the first valve and at least a second and a third of the plurality of actuators is in downstream fluid communication with the second valve, and wherein the plurality of actuators are operable to selectively actuate the plurality of synchronizers upon receipt of a flow of pressurized hydraulic fluid from at least one of the first and second actuator control devices.

2. The hydraulic control system of claim 1 further comprising a valve control device operable to move the first valve between a first and a second position, wherein the first and second actuator control devices are in fluid communication with the first of the plurality of actuators when the first valve is in the second position and wherein the first and second actuator control devices are in fluid communication with the second valve when the first valve is in the first position.

3. The hydraulic control system of claim 2 wherein hydraulic fluid from the first clutch control device moves the second valve to a first position and the hydraulic fluid from the second clutch control device moves the second valve to a second position, and wherein the first and second actuator control devices are in fluid communication with the second of the plurality of actuators when the second valve is in the first position and the first and second actuator control devices are in fluid communication with the third of the plurality of actuators when the second valve is in the second position.

4. The hydraulic control system of claim 1 wherein the first and second clutch control devices are operable to control a flow of hydraulic fluid through the first and second clutch control devices.

5. The hydraulic control system of claim 1 wherein the first and second actuator control devices are operable to control a pressure of hydraulic fluid through the first and second actuator control devices.

6. The hydraulic control system of claim 1 wherein the first valve includes a first input in fluid communication with the first actuator control device, a second input in fluid communication with the second actuator control device, a first output, a second output, a third output, and a fourth output, wherein the second valve includes a first input in fluid communication with the second output of the first valve, a second input in fluid communication with the fourth output of the first valve, a first output, a second output, a third output, and a fourth output, and wherein the first of the plurality of actuators is in fluid communication with the first and third outputs of the first valve, the second of the plurality of actuators is in fluid communication with the second and fourth outputs of the second valve, and the third of the plurality of actuators is in fluid communication with the first and third outputs of the second valve.

7. The hydraulic control system of claim 6 wherein the first valve is operable to communicate hydraulic fluid from the first input to the second output and to communicate hydraulic fluid from the second input to the fourth output when the first valve is in a first position and wherein the first valve is operable to communicate hydraulic fluid from the first input to the first output and to communicate hydraulic fluid from the second input to the third output when the first valve is in a second position.

8. The hydraulic control system of claim 7 wherein the second valve is operable to communicate hydraulic fluid from the first input to the second output and to communicate hydraulic fluid from the second input to the fourth output when the second valve is in a first position and wherein the second valve is operable to communicate hydraulic fluid from the first input to the first output and to communicate hydraulic fluid from the second input to the third output when the second valve is in a second position.

9. The hydraulic control system of claim 8 wherein the first of the plurality of actuators includes a first port in fluid communication with the first output of the first valve and a second port in fluid communication with the third output of the first valve, wherein the second of the plurality of actuators includes a first port in fluid communication with the second output of the second valve and a second port in fluid communication with the fourth output of the second valve, and wherein the third of the plurality of actuators includes a first port in fluid communication with the first output of the second valve and a second port in fluid communication with the third output of the second valve.

10. The hydraulic control system of claim 9 wherein the first and second valves each include a biasing member operable to bias the first and second valves to the first positions.

11. A hydraulic control system for controlling a dual clutch and a plurality of synchronizers in a transmission, the hydraulic control system comprising:
   a source of a flow of pressurized hydraulic fluid;
   a first actuator control device in direct downstream fluid communication with the source of pressurized hydraulic fluid;
   a second actuator control device in direct downstream fluid communication with the source of pressurized hydraulic fluid;
   a first clutch control device having an input in direct fluid communication with the source of pressurized hydraulic fluid and an output, the first clutch control device having at least an open state wherein hydraulic fluid communicates from the input to the output and a closed state wherein hydraulic fluid cannot communicate from the input to the output;
   a first clutch actuator for engaging a first clutch of the dual clutch, wherein the first clutch actuator is in downstream fluid communication with the output of the first clutch control device, and wherein the first clutch actuator engages the first clutch of the dual clutch when the first clutch control device is opened;
   a second clutch control device having an input in direct fluid communication with the source of pressurized hydraulic fluid and an output, the second clutch control device having at least an open state wherein hydraulic fluid communicates from the input to the output and a closed state wherein hydraulic fluid cannot communicate from the input to the output;
   a second clutch actuator for engaging a second clutch of the dual clutch, wherein the second clutch actuator is in downstream fluid communication with the output of the second clutch control device, and wherein the second clutch actuator engages the second clutch of the dual clutch when the second clutch control device is opened;
   a first valve in communication with the first and second actuator control devices, the first valve moveable between at least a first position and a second position;
   a second valve in communication with the first valve when the first valve is in the second position, the first clutch control device and the second clutch control device, and wherein the second valve is in a first position when the first clutch control device is opened and wherein the second valve is in a second position when the second clutch control device is opened; and
   a plurality of actuators wherein at least a first of the plurality of actuators is in downstream fluid communication with the first valve when the first valve is in the second position, at least a second of the plurality of actuators is in downstream fluid communication with the second valve when the second valve is in the first position and at least a third of the plurality of actuators is in downstream fluid communication with the second valve when the second valve is in the second position, and wherein the plurality of actuators are operable to selectively actuate the plurality of synchronizers upon receipt of a flow of pressurized hydraulic fluid from at least one of the first and second actuator control devices.

12. The hydraulic control system of claim 11 further comprising a valve control device operable to move the first valve between the first and the second position.

13. The hydraulic control system of claim 12 wherein the first and second clutch control devices are electrically controlled variable flow solenoids, the first and second actuator control devices are electrically controlled variable force solenoids with pressure feedback, and the valve control device is an on/off solenoid.

14. The hydraulic control system of claim 11 wherein hydraulic fluid from the first clutch control device acts on an end of the second valve to move the second valve to the first position and wherein hydraulic fluid from the second clutch control device acts on an opposite end of the second valve to move the second valve to the second position.

15. The hydraulic control system of claim 11 wherein the first and second clutch control devices are operable to control a flow of hydraulic fluid from the inputs to the outputs of the first and second clutch control devices.

16. The hydraulic control system of claim 11 wherein the first and second actuator control devices are operable to control a pressure of hydraulic through the first and second actuator control devices.

17. The hydraulic control system of claim 11 wherein the first clutch actuator is operable to engage the first clutch of the dual clutch to initiate even gear ratios and a reverse gear ratio and the second clutch actuator is operable to engage the second clutch of the dual clutch to initiate odd gear ratios and a reverse gear ratio.

18. The hydraulic control system of claim 17 wherein the first of the plurality of actuators is operable to engage a third gear ratio and the reverse gear ratio, the second of the plurality of actuators is operable to engage a first forward gear ratio and a fifth forward gear ratio, and the third of the plurality of actuators is operable to engage a second forward gear ratio and a fourth forward gear ratio.

19. The hydraulic control system of claim 11 wherein the source of pressurized hydraulic fluid comprises a pump.

20. The hydraulic control system of claim 19 wherein the source of pressurized hydraulic fluid further includes a pump bypass valve operable to divert an output flow of pressurized hydraulic fluid from an outlet of the pump to an inlet of the pump, and wherein the source of pressurized hydraulic fluid further comprises an accumulator in downstream fluid communication with the pump and the pump bypass valve.

21. The hydraulic control system of claim 20 wherein the pump bypass valve is controlled by a bypass control device, wherein the bypass control device is in direct downstream fluid communication with the accumulator.

22. The hydraulic control system of claim 11 wherein the first and second valves each include a biasing member operable to bias the first and second valves to the first positions, and wherein the second of the plurality of actuators is operable to engage a first gear ratio.

23. A hydraulic control system for controlling a dual clutch and a plurality of synchronizers in a transmission, the hydraulic control system comprising:

a source of a flow of pressurized hydraulic fluid;
a first pressure control device in direct downstream fluid communication with the source of pressurized hydraulic fluid;
a second pressure control device in direct downstream fluid communication with the source of pressurized hydraulic fluid;
a first flow control device having an input in direct fluid communication with the source of pressurized hydraulic fluid and an output, the first flow control device having at least an open state wherein hydraulic fluid communicates from the input to the output and a closed state wherein hydraulic fluid cannot communicate from the input to the output;
a first clutch actuator for engaging a first clutch of the dual clutch, wherein the first clutch actuator is in downstream fluid communication with the output of the first flow control device, and wherein the first clutch actuator engages the first clutch of the dual clutch when the first flow control device is opened;
a second flow control device having an input in direct fluid communication with the source of pressurized hydraulic fluid and an output, the second flow control device having at least an open state wherein hydraulic fluid communicates from the input to the output and a closed state wherein hydraulic fluid cannot communicate from the input to the output;
a second clutch actuator for engaging a second clutch of the dual clutch, wherein the second clutch actuator is in downstream fluid communication with the output of the second flow control device, and wherein the second clutch actuator engages the second clutch of the dual clutch when the second flow control device is opened;
a valve control device having an input in direct fluid communication with the source of pressurized hydraulic fluid and an output, the valve control device having at least an open state wherein hydraulic fluid communicates from the input to the output and a closed state wherein hydraulic fluid cannot communicate from the input to the output;
a first valve in communication with the first and second pressure control devices and the valve control device, wherein the first valve is moveable between at least a first position and a second position when the valve control device is opened;
a second valve in communication with the first valve when the first valve is in the second position, and in communication the first flow control device and the second flow control device, and wherein the second valve is in a first position when the first flow control device is opened and wherein the second valve is in a second position when the second flow control device is opened; and
a plurality of actuators wherein at least a first of the plurality of actuators is in downstream fluid communication with the first valve when the first valve is in the second position, at least a second of the plurality of actuators is in downstream fluid communication with the second valve when the second valve is in the first position and at least a third of the plurality of actuators is in downstream fluid communication with the second valve when the second valve is in the second position, and wherein the plurality of actuators are operable to selectively actuate the plurality of synchronizers upon receipt of a flow of pressurized hydraulic fluid from at least one of the first and second pressure control devices.

24. The hydraulic control system of claim 23 wherein hydraulic fluid from the first flow control device acts on an end of the second valve to move the second valve to the first position and wherein hydraulic fluid from the second flow control device acts on an opposite end of the second valve to move the second valve to the second position.

25. The hydraulic control system of claim 23 wherein the first clutch actuator is operable to engage the first clutch of the dual clutch to initiate even gear ratios and the second clutch actuator is operable to engage the second clutch of the dual clutch to initiate odd gear ratios and a reverse gear ratio.

26. The hydraulic control system of claim 25 wherein the first of the plurality of actuators is operable to engage a third gear ratio and the reverse gear ratio, the second of the plurality of actuators is operable to engage a first forward gear ratio and a fifth forward gear ratio, and the third of the plurality of actuators is operable to engage a second forward gear ratio and a fourth forward gear ratio.

27. The hydraulic control system of claim 23 wherein the source of pressurized hydraulic fluid further includes a pump and a pump bypass valve operable to divert an output flow of pressurized hydraulic fluid from an outlet of the pump to an inlet of the pump, and wherein the source of pressurized hydraulic fluid further comprises an accumulator in downstream fluid communication with the pump and the pump bypass valve.

28. The hydraulic control system of claim 27 wherein the pump bypass valve is controlled by a bypass control device, wherein the bypass control device is in direct downstream fluid communication with the accumulator.

29. The hydraulic control system of claim 23 wherein the first and second valves each include a biasing member operable to bias the first and second valves to the first positions, and wherein the second of the plurality of actuators is operable to engage a first gear ratio.

* * * * *